United States Patent
Choi et al.

(10) Patent No.: US 9,369,505 B2
(45) Date of Patent: Jun. 14, 2016

(54) SYSTEM FOR SHARING EVENT AND DATA BETWEEN PERSONAL DEVICES

(75) Inventors: Joong-Min Choi, Hwaseong-si (KR); Mi Ae Lee, legal representative, Hwaseong-si (KR); Ho-Cheol Jeon, Seoul (KR)

(73) Assignee: INDUSTRY-UNIVERSITY COOPERATION FOUNDATION HANYANG UNIVERSITY ERICA CAMPUS (KR)

( * ) Notice: Subject to any disclaimer, the term of this patent is extended or adjusted under 35 U.S.C. 154(b) by 318 days.

(21) Appl. No.: 13/989,765

(22) PCT Filed: Nov. 24, 2011

(86) PCT No.: PCT/KR2011/009042
§ 371 (c)(1),
(2), (4) Date: Apr. 7, 2014

(87) PCT Pub. No.: WO2012/070900
PCT Pub. Date: May 31, 2012

(65) Prior Publication Data
US 2014/0258404 A1     Sep. 11, 2014

(30) Foreign Application Priority Data

Nov. 24, 2010 (JP) .......................... 10-2010-0117662
Jan. 26, 2011 (JP) .......................... 10-2011-0007958

(51) Int. Cl.
G06F 15/16 (2006.01)
H04L 29/06 (2006.01)
G06F 17/30 (2006.01)

(52) U.S. Cl.
CPC ........ *H04L 65/403* (2013.01); *G06F 17/30575* (2013.01)

(58) Field of Classification Search
USPC .......... 709/203, 204, 206, 217, 219, 223, 224
IPC ........................... H04L 65/403; G06F 17/3075
See application file for complete search history.

(56) References Cited

U.S. PATENT DOCUMENTS 7,099,919 B2 * 8/2006 Kusumoto .............. G06F 9/542
                                                          709/205
8,005,898 B2 * 8/2011 Sato ...................... G06F 3/1454
                                                          709/203

FOREIGN PATENT DOCUMENTS

| JP | 2009157737 A | 7/2009 |
|---|---|---|
| JP | 2010176336 A | 8/2010 |
| KR | 100901967 B1 | 6/2009 |
| WO | 2005096176 A | 10/2005 |

* cited by examiner

*Primary Examiner* — Quang N Nguyen (57) ABSTRACT

A personal information server in a system for event and data sharing includes: a server data manager configured to receive an event triggered at a personal device being used, from among the personal devices, and data information related to the event; and a server database manager configured to store the event and data information received at the server data manager, where the server data manager transmits the event and data information stored at the server database manager to a personal device that does not have the event and data information from among the registered personal devices, and a data sharing application installed in each of the registered personal devices transmits the event and data information triggered at the personal device. The disclosed system provides the advantage of enabling data sharing among a user's personal devices and thus allowing more intelligent services based on dynamic data sharing between personal devices.

14 Claims, 6 Drawing Sheets

SYSTEM FOR SHARING EVENT AND DATA BETWEEN PERSONAL DEVICES

CROSS-REFERENCE TO RELATED APPLICATIONS

This application is a National Phase Application of PCT International Application No. PCT/KR2011/009042, which was filed on Nov. 24, 2011, and which claims priority from Korean Patent Application No. 10-2010-0117662, filed with the Korean Intellectual Property Office on Nov. 24, 2010, and Korean Patent Application No. 10-2011-0007958, filed with the Korean Intellectual Property Office on Jan. 26, 2011. The disclosures of the above patent applications are incorporated herein by reference in their entirety.

BACKGROUND

1. Technical Field

Embodiments of the present invention relate to a data sharing system, more particularly to a system for sharing data among a user's personal devices.

2. Description of the Related Art

With the advent of the Internet, there have been rapid developments in the field of data communication. It is now common to search and utilize information by using the Internet, and the importance of Internet-based electronic commerce is continuously increasing.

In recent times, innovations in wireless communication have also led to rapid developments in personal devices. Whereas, in the past, personal computers and laptops were used for wired data communications, it is now possible to implement data communications in a wireless manner by using smart phones and personal miniature computers, and therefore a user may access a data network and utilize services through various devices such as a personal computer, a laptop, a PDP, and a smart phone.

Based on such developments in wireless communication and personal devices, it is expected that ubiquitous networks will soon be implemented which will enable data communication at any time and at any place.

As data communication is possible through various devices, the number of data communication devices carried by users is increasing, and as users play or edit user data using various devices, there is a need for data sharing between such personal devices.

SUMMARY

An aspect of the invention is to provide a data sharing system that allows easy sharing of data among a user's personal devices.

To achieve the objective above, one aspect of the invention provides a personal information server configured to communicate over a network with a plurality of registered personal devices. The personal information server includes: a server data manager configured to receive an event triggered at a personal device being used, from among the plurality of personal devices, and data information related to the event; and a server database manager configured to store the event and data information received at the server data manager, where the server data manager transmits the event and data information stored at the server database manager to a personal device that does not have the event and data information from among the registered personal devices, and a data sharing application installed in each of the plurality of registered personal devices transmits the event and data information triggered at the personal device.

The server data manager may transmit the event and data information to another personal device regardless of a request from the personal devices.

When a use of a particular personal device from among the plurality of personal devices is detected, the server data manager may transmit the event and data information stored at the server database manager to the particular personal device.

Upon receiving the event and data information from the personal device being used, the server data manager may transmit the event and data information over the network to other personal devices available for communication.

The data sharing application installed in the personal device may transmit the event and data information regardless of a request by a user and may control the personal device to transmit activation information to the server data manager when the personal device is turned on or activated by a use by the user.

Upon receiving the event and data information from the personal information server, the data sharing application installed in the personal device may control the personal device to perform an active process corresponding to the received event and data type.

One of the personal devices can operate as the personal information server.

At least one of the personal devices can have a server application installed thereon so as to operate as a server together with the personal information server.

Between the personal information server and the personal device operating as a server, one can operate as a main server while the other can operate as a sub-server.

Another aspect of the invention provides a personal device of a user configured to communicate over a network with a personal information server. The personal device includes: a personal device data manager configured to receive from the personal information server an event triggered at another personal device of the user and data information related to the event; and a personal device monitoring manager configured to monitor and collect an event triggered by a use of the personal device of the user and data information, where the personal device data manager transmits the event and data information collected at the personal device monitoring manager to the personal information server.

The personal device data manager may transmit the collected event and data information to the personal information server regardless of a request by the user.

The personal device data manager may access the personal information server and receive the event and data information of another personal device regardless of a request by the user.

The personal device data manager may transmit activation information to the personal information server when the personal device of the user is turned on or activated by use.

The personal device can further include an active process manager, which, when an event and data information triggered at another personal device of the user is received, may perform an active process corresponding to the received event and data type.

The active process manager may automatically execute data based on a learning result regarding whether or not the data is reused.

Yet another aspect of the invention provides a recorded medium having recorded thereon and tangibly embodying a program of instructions executable by a personal device of a user, in an event and data sharing system comprising a plurality of personal devices and a personal information server configured for communication over a network. The program of instructions is configured to perform a method that includes: (a) receiving from the personal information server an event triggered at another personal device of the user and data information related to the event; (b) monitoring the personal device of the user and collecting an event triggered by use and data information; and (c) transmitting the collected event and data information to the personal information server.

Embodiments of the invention enable data sharing among a user's personal devices, allowing more intelligent services based on dynamic data sharing between personal devices.

Additional aspects and advantages of the present invention will be set forth in part in the description which follows, and in part will be obvious from the description, or may be learned by practice of the invention.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention are described below in more detail with reference to the accompanying drawings.

Figure 1:
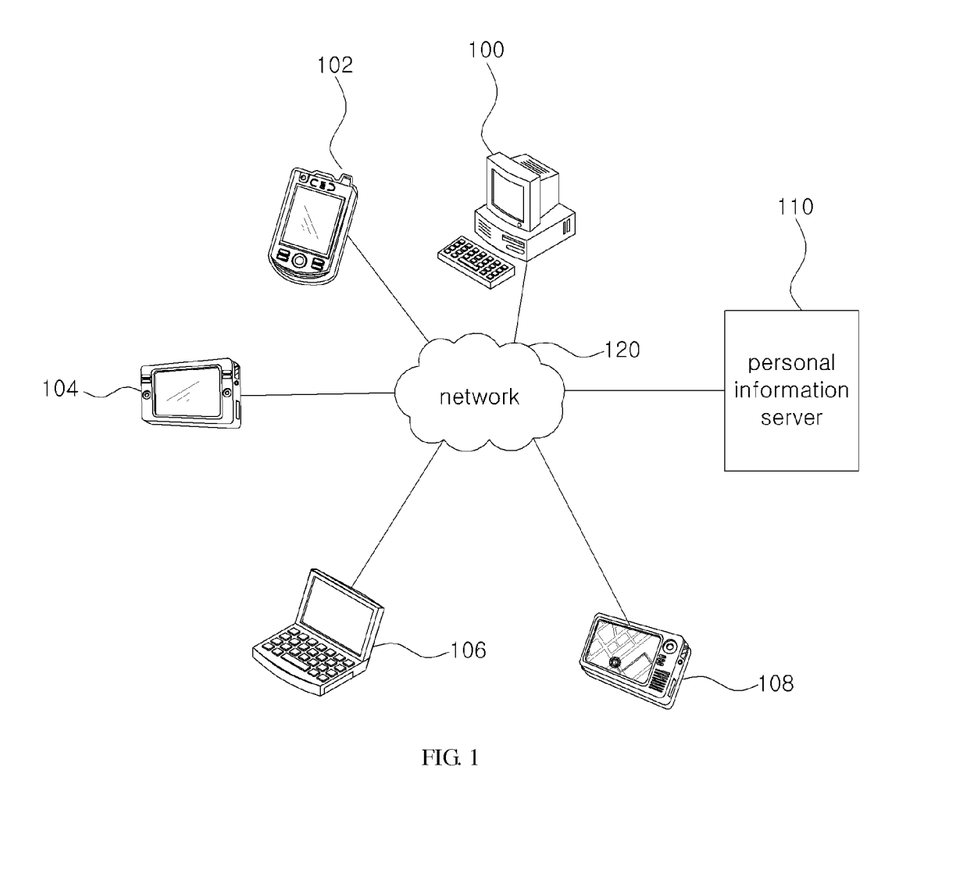
FIG. 1 illustrates the composition of a data sharing system according to an embodiment of the invention.

FIG. 1 illustrates the composition of a data sharing system according to an embodiment of the invention.

Referring to FIG. 1, a data sharing system according to an embodiment of the invention can include a multiple number of personal devices 100, 102, 104, 106, 108 and a personal information server 110.

The multiple personal devices 100, 102, 104, 106, 108 can communicate with the personal information server 110 over a network 120. Here, the network 120 may include various types of networks accessible by the personal devices 100, 102, 104, 106, 108, including for example the Internet, private networks, mobile communication networks, and near-field networks.

The personal devices 100, 102, 104, 106, 108 can include various devices that are capable of communicating with a communication network and executing applications. For instance, a first personal device 100 can be a desktop PC that the user uses at the office, a second personal device 102 can be a smart phone carried by the user, a third personal device 104 can be a PMP (portable media player) that the user carries and uses for playing media data, a fourth personal device 106 can be a laptop that the user uses at home, and a fifth personal device 108 can be a navigation device that the user uses in a car.

Each personal device 100, 102, 104, 106, 108 may be installed with a data sharing application. The user can access a separate application provider server (not shown) with each personal device to install the data sharing application on each personal device.

The data sharing application installed on each of the personal devices 100, 102, 104, 106, 108 may monitor the actions that the user performs through the personal device and may detect and collect the user's personal event as well as the data associated with the event.

Here, the event information refers to the user's personal event, the action performed by the user through the personal device, and supplementary information regarding the action. For instance, if the user drafts a document with a word processor, information on the word-processing action performed by the user corresponds to the event information, while supplementary information such as information on the duration of the word-processing action and information on the application associated with the word-processing can also be detected as event information.

The data information associated with an event refers to a data file associated with the action corresponding to the detected event or address information by which to reach the data file associated with the action corresponding to the detected event. If the user's event is a word-processing action, the data associated with the event would be the word file used in the word-processing action.

Considering another example of an event and data information associated with the event, if the user surfs the web through a web browser on the second personal device 102, i.e. the smart phone, the data sharing application may detect the user's web-surfing action (event information) and detect the address information of the web page visited by the user (data information associated with the event).

As another example, if the user plays a music file using the third personal device 104, i.e. the PMP, the data sharing application installed on the PMP may monitor the user's action of playing the music file (event information) and detect information on the music file played by the user (e.g. address information for streaming the music file).

The data sharing application may preferably transmit the event information of the event triggered at the personal device and the data information related to the event to the personal information server 110 regardless of an explicit request by the user. However, those skilled in the art would readily understand that it is possible to implement the transmitting when there is a request from the user and that it is also possible to allow the user to adjust the settings and select whether to implement the transmitting regardless of a request or implement the transmitting in accordance to a request.

The data sharing application can operate to transmit to the personal information server an event that has lasted longer than a preset duration of time and its related data, from among the events triggered at the personal device. Since the transmitting of all events and data triggered at the personal device can result in an excessive amount of data stored on the personal information server, the event and data information that are to be transmitted can be filtered according to event duration.

Alternatively, it is also possible to determine which events and related data to filter based on the type of event. The data sharing application may preferably provide an interface that allows the user to adjust the settings for filtering as regards the event duration or event type information, etc.

As described above, the data sharing application's monitoring of the user's recent events, data collection, and transmitting of the collected events and data to the personal information server 110 may preferably be performed implicitly.

That is, regardless of the user's explicit request, the data sharing application may control the personal device such that the personal device accesses the personal information server 110 and transmits the collected event and data, and the event and data information collected by the data sharing application may be stored on the personal information server 110 unbeknownst to the user.

The user's recent events and data stored on the personal information server 110 may be transmitted to the other personal devices which the user registered on the personal information server 110. For example, if the user conducted a word-processing action on the first personal device 100, i.e. the desktop computer, so that a word data file is transmitted to and stored on the personal information server 110, then the recent event and data information thus stored may be transmitted by the personal information server 110 to the user's other registered personal devices 102, 104, 106, 108.

The time point at which the personal information server 110 transmits the stored recent event and data information can be adjusted in various ways. According to an embodiment of the invention, when the user activates one of the personal devices registered on the personal information server 110, the personal information server 110 can transmit the stored recent event and data information to the activated device. For example, after the word data file is transmitted from the desktop computer to the personal information server 110, if the user comes home and uses the fourth personal device, i.e. the laptop computer 106, then the data sharing application installed on the laptop computer 106 may transmit laptop usage information to the personal information server 110, and the personal information server 110 may transmit the personal event and the data information related to the event, including the word data file, to the laptop computer 106.

According to another embodiment of the invention, the personal information server 110 can also transmit the stored recent event and data information to all personal devices connected to the network and available for communication, regardless of whether or not the personal devices are actually being used.

The communication between the personal devices 100, 102, 104, 106, 108 and the personal information server 110 can be implemented in various ways. For example, the second personal device 102, i.e. the smart phone, could communicate with the personal information server through an IP-based connection via the wireless Internet using Wi-fi, and in areas that do not support the wireless Internet, could communicate with the personal information server by way of a cellular network. While the action for transmitting the event stored in the personal information server 110 and the data information associated with the event to other personal devices may also preferably be implemented regardless of the user's request, the invention is not thus limited.

In order to keep the most recent events and data information, the personal information server 110 may preferably delete event and data information for which a preset duration of time has passed. However, the action for deleting data may not be necessary if there is sufficient server capacity.

With the data sharing system according to an embodiment of the invention described above, the event information triggered at another personal device and its associated data can be shared automatically, even when there is no explicit request from the user for sharing data, enabling intelligent services for the user utilizing various personal devices.

Figure 2:
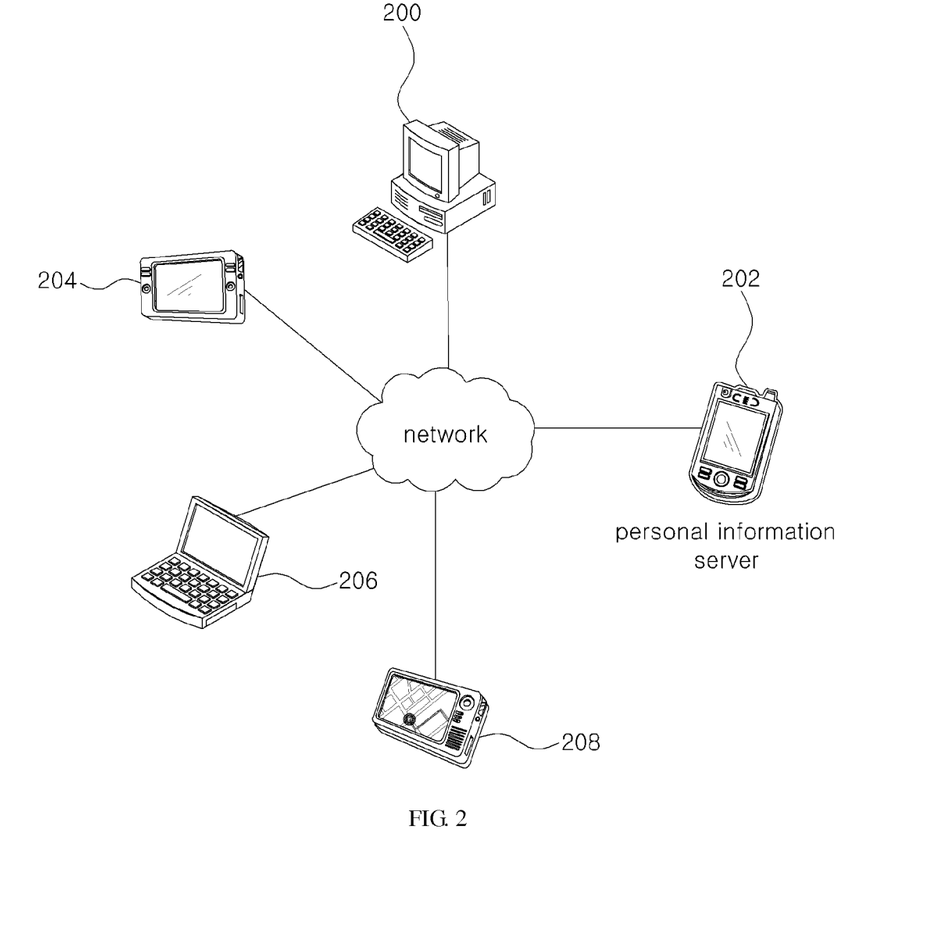
FIG. 2 illustrates the composition of a data sharing system according to another embodiment of the invention.

FIG. 2 illustrates the composition of a data sharing system according to another embodiment of the invention.

Compared to the embodiment illustrated in FIG. 1, the system in FIG. 2 is composed only of the personal devices 200, 202, 204, 206, 208, without including a personal information server. The system illustrated in FIG. 2 is one in which one of the user's personal devices functions as the personal information server and thus is not equipped with a separate personal information server.

FIG. 2 illustrates an example in which the user's second personal device, i.e. the smart phone, functions as a personal device and a personal information server simultaneously.

As in the embodiment of FIG. 1, each personal device may perform the actions of monitoring events to detect recent events and data, and transmitting these to the personal information server.

Also, the second device, i.e. the smart phone 202, which functions as the personal information server, may be installed with a server application in addition to the data sharing application. Compared with the embodiment illustrated in FIG. 1, the embodiment of FIG. 2 entails the same basic operations, except that the smart phone 202, which is one of the personal devices, also serves the role of the personal information server.

The data sharing application installed on each of the personal devices 200, 202, 204, 206 may monitor and sense events triggered by the user's actions, to detect the events and their associated data.

The events and data detected by the data sharing application may be transmitted from the respective personal devices to the smart phone 102 functioning as the personal information server. For example, if the user is listening to music on the desktop PC 100, the data sharing application may transmit the music-listening event and its related music data file information to the smart phone 102 functioning as the personal information server. The information thus transmitted may be stored by the smart phone 102 in a separate storage area for storing the personal events and data.

The smart phone 102, after receiving the personal event and data information from a personal device, may transmit the stored recent event and data information to the other personal devices that were registered for data sharing.

As described above, the smart phone can transmit the stored recent event and data information when a particular personal device is used by the user, or alternatively can transmit the stored recent event and data information to all devices available for communication over the network.

While FIG. 2 illustrates the role of the personal information server being performed by the smart phone from among the various personal devices, it should be apparent to those skilled in the art that any personal device can be installed with a server application to function as the personal information server. However, it may be advantageous if the personal device functioning as the personal information server is a device that is always kept on and always connected with a network, as is the case for a smart phone.

Figure 3:
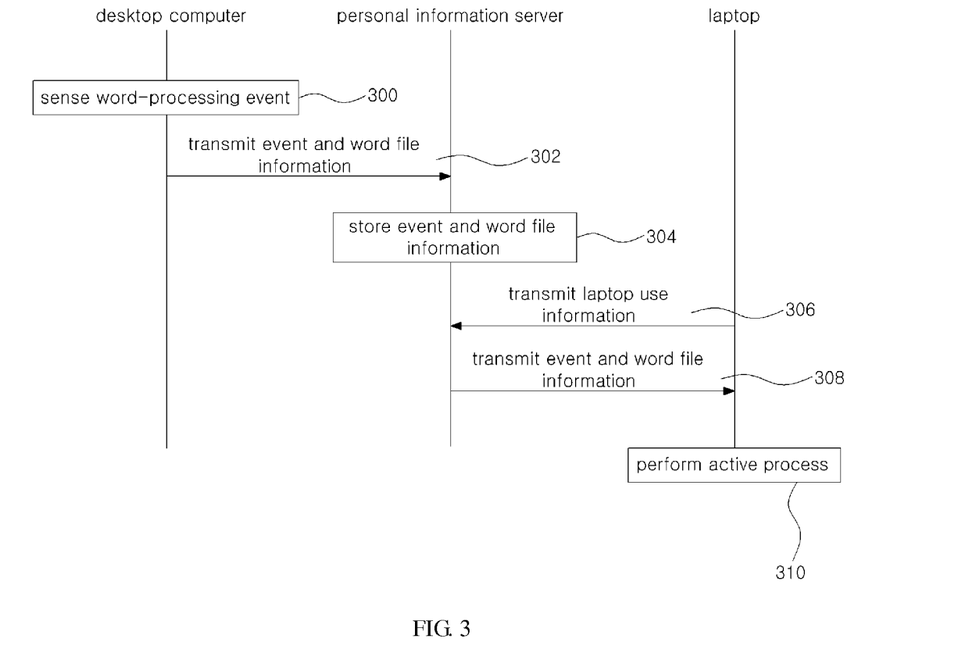
FIG. 3 is a flow diagram of the operations in the system illustrated in FIG. 1.

FIG. 3 is a flow diagram of the operations in the system illustrated in FIG. 1.

FIG. 3 illustrates a flow diagram of operations for an example in which a word file drafted by the user on a desktop computer is shared with a laptop computer located at the user's home.

Referring to FIG. 3, the data sharing application installed on the desktop computer may monitor the user's actions to sense the user's word-processing event and detect the word data file drafted thus (step 300).

The data sharing application of the desktop computer may control the desktop computer to transmit the sensed event and data to the personal information server (step 302). In one example, the personal information server can be a server capable of communicating over an IP-based connection, and the desktop computer can transmit the event and data information to the personal information server over the Internet.

The personal information server, having received the event and data information from the desktop PC, may store the information (step 304).

As the user, after conducting a word-processing action at the office, returns home to turn on and start using the laptop computer, the data sharing application installed on the laptop computer may provide the personal information server with the information that the user is using the laptop computer (step 306).

The personal information server, upon sensing the activation of the laptop computer, another of the user's personal devices, may transmit the user's recent event stored thereon and its related data information to the laptop computer (step 308). Of course, if the laptop computer is capable of communicating with the personal information server before the user's manipulation, then it is also possible to transmit the event and data information to the laptop computer beforehand, as already described above.

The data sharing application installed on the laptop computer may monitor the user's actions and may perform an active process according to the user's action type (step 310). Here, the active process can be configured beforehand according to the user's action type, or can also be performed based on artificial intelligence which learns the anticipated behavior according to the user's action type.

For instance, if a learning result based on artificial intelligence is that word files handled by the user on the desktop computer at the office is frequently also handled on the laptop computer, then the data sharing application can perform an active process such that the shared word data file is loaded automatically when the user executes the word-processing program.

In another example, if a learning result based on artificial intelligence is that word files mainly handled by the user on the desktop computer at the office is sometimes also handled on the laptop computer, then the data sharing application can provide the user with a message questioning whether or not to load the shared word file and can perform the active process to load the shared word data file when there is a request from the user.

Figure 4:
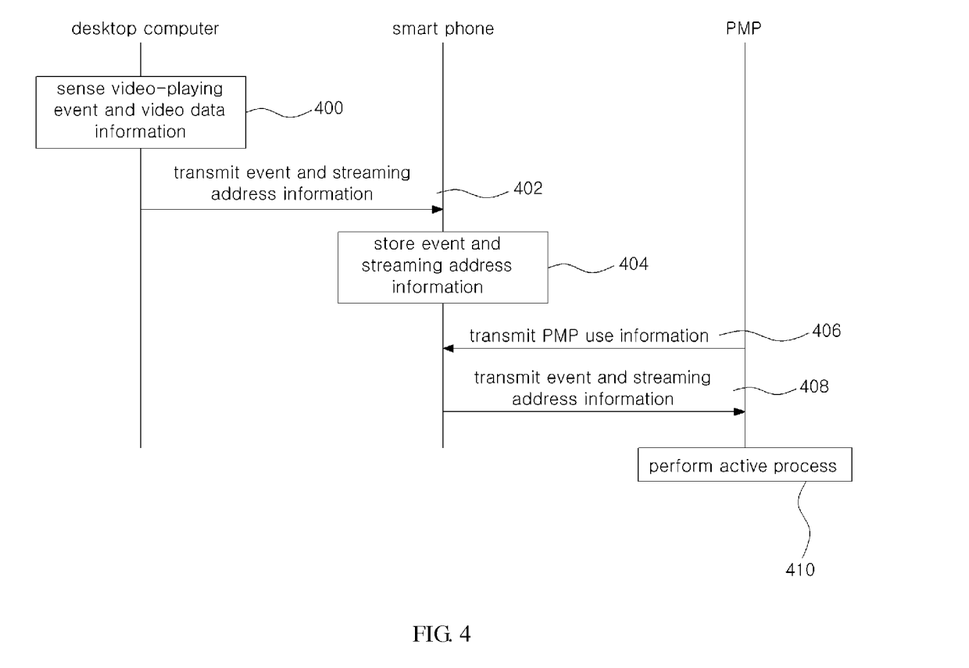
FIG. 4 is a flow diagram of the operations in the system illustrated in FIG. 2.

FIG. 4 is a flow diagram of the operations in the system illustrated in FIG. 2.

FIG. 4 illustrates a flow diagram of operations for an example in which the user plays a video clip on a desktop computer and the video information is shared with a PMP, another of the user's personal devices.

Referring to FIG. 4, the data sharing application installed on the desktop computer may monitor the user's action of playing the video clip to sense the video-playing event and detect the data information of the video clip being played (step 400). Here, it is assumed that the video clip data is streaming data provided from a streaming server having a particular address.

The data sharing application of the desktop computer may transmit the event sensed through the desktop computer and the data information to the smart phone functioning as the personal information server (step 402). Here, the data information of the video clip can include address information from which the streaming video data can be provided. The desktop computer can provide the event and data information to the smart phone by using a preset communication scheme. The desktop computer and the smart phone can communicate over an IP network, or if they are located at a close distance, the data communication can be performed by way of a near-field communication module such as a Bluetooth module.

The smart phone may store the event and data information received from the desktop computer (step 404).

If the user leaves the office and turns on and manipulates the PMP while heading home, the data sharing application installed on the PMP may provide the information that the PMP is being used by the user to the smart phone functioning as the personal information server (step 406).

The smart phone, having sensed the activation of another one of the user's personal devices, i.e. the PMP, may transmit the stored event and data information (step 408).

The data sharing application installed on the PMP may monitor the user's actions and perform an active process (step 410). As described above, the active process can be set beforehand or can be performed based on artificial intelligence that entails learning the user's action types.

For instance, if the settings are configured to play shared data first, the PMP can perform the action of receiving the video clip from the streaming data from the shared address for streaming data.

If the active process is performed based on artificial intelligence, and a learning result indicates that a file played on the desktop computer is not frequently continued by the user on the PMP, then the data sharing application can question the user whether or not to play the video data previously played on the desktop and can perform the active process based on the user's reply.

Figure 5:
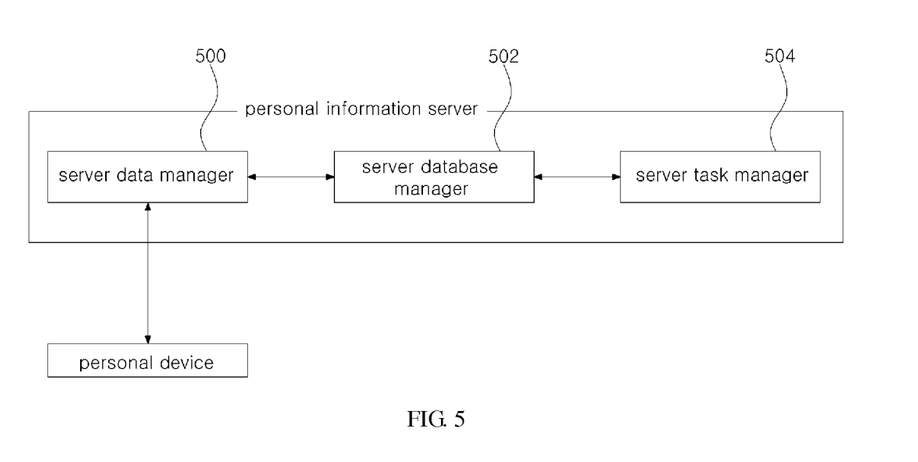
FIG. 5 is a block diagram illustrating the modular composition of a personal information server according to an embodiment of the invention.

FIG. 5 is a block diagram illustrating the modular composition of a personal information server according to an embodiment of the invention.

As described above, a separate server can be maintained for storing the personal information or one of the personal devices installed with a server application can be made to function as the personal information server.

Referring to FIG. 5, a personal information server according to an embodiment of the invention can include a server data manager 500, a server task manager 504, and a server database manager 502.

The server data manager 500 may serve to manage the connections to the registered personal devices and exchange data with the personal devices. The server data manager 500 may receive event and data information from a particular personal device. Also, the server data manager transmit the stored event and data information to personal devices with which connections are maintained, thereby achieve data sharing among the personal devices. In an embodiment of the invention, the connections with personal devices can be maintained by way of Java RMI (Remote Method Invocation), but the invention is not thus limited.

The server database manager 502 may store the user's recent events and data information received through the server data manager. Also, the server database manager 504 may store information on each of the personal devices registered by the user and information on the user as well. Here, the information on a personal device can include the device type, address, and environment information.

The server data manager 500 may use the personal device information stored on the server database manager 502 to maintain a connection with and communicate with each personal device. The server data manager 500 may transmit the recent event and data information stored on the server database manager 502 to the personal devices, thereby enabling sharing among the personal devices.

The server task manager 504 may manage the user's events and data information stored on the server database manager 504. If a stored set of event and data information is related to an event for which a preset amount of time has passed, then the server task manager 504 may delete the information to keep the most recent events and data information in the server database manager 502. For example, the server task manager 504 can manage the information stored on the server database manager 504 such that events for which a day has passed and their related data are deleted.

Figure 6:
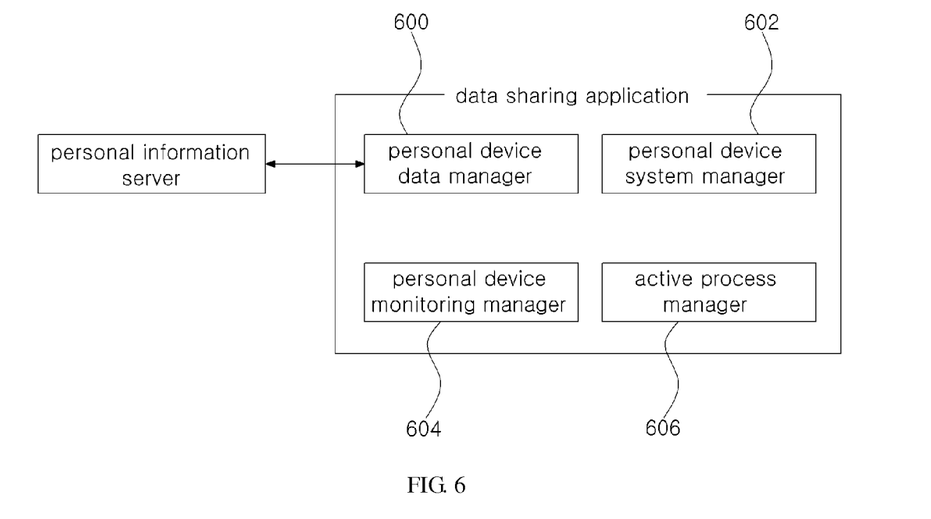
FIG. 6 is a block diagram illustrating the modular composition of a data sharing application installed on each personal device.

FIG. 6 is a block diagram illustrating the modular composition of a data sharing application installed on each personal device.

Referring to FIG. 6, a data sharing application according to an embodiment of the invention can include a personal device data manager 600, a personal device system manager 602, a personal device monitoring manager 604, and an active process manager 606.

The personal device data manager 600 may serve to maintain a connection with and communicate with the server. The personal device data manager 600 may operate when the personal device is started, inform the personal information server that the personal device is available for communication over the network, and configure the connection to the personal information server.

When the configuring of the connection to the personal information server is complete, the personal device data manager 600 may receive from the personal information server the recent event and data information triggered at another user personal device. The personal device data manager 600 can transmit the event and data information to the personal information server stored beforehand and can receive only the event and data information that is not already stored.

Also, the personal device data manager 600 may transmit to the personal information server the event and data information triggered at the personal device being used.

The personal device system manager 602 may manage the environment information of the personal device. The client system manager 602 may store and manage environment information, such as the type of the personal device, the application programs installed on the personal device, etc., in the form of a separate file. For instance, the environment information of the personal device may be managed in the form of an XML file, which may be modified when there is a change.

The personal device monitoring manager 604 may monitor the user's actions on the personal device and may collect information on the triggered events and data. Event information may be collected, such as regarding the application programs executed by the user and the actions performed by the user with the application programs, and the information on the data associated with the events may be collected. The collected information regarding the events and data may be transmitted through the personal device data manager 600 to the personal information server.

When the user's recent events and data are received from the personal information server, the active process manager 606 may use these to perform an active process. The active process may be performed based on the type of the received event and data. As described above, the active process performed according to the type of the event and data can be configured beforehand, and the active process can also be performed based on artificial intelligence that learns the user's patterns.

According to a preferred embodiment of the invention, the active process manager 606 may perform an active process by predicting whether or not the user's recent event and data received from the personal information server will be reused.

The active process manager 606 may store information on the user's usage pattern of personal devices and may predict whether or not the shared data file will be reused by using the stored usage pattern information.

According to an embodiment of the invention, the active process manager 606 can predict the reuse of a data file by using two classes of information, domain information and context information.

Figure 10:
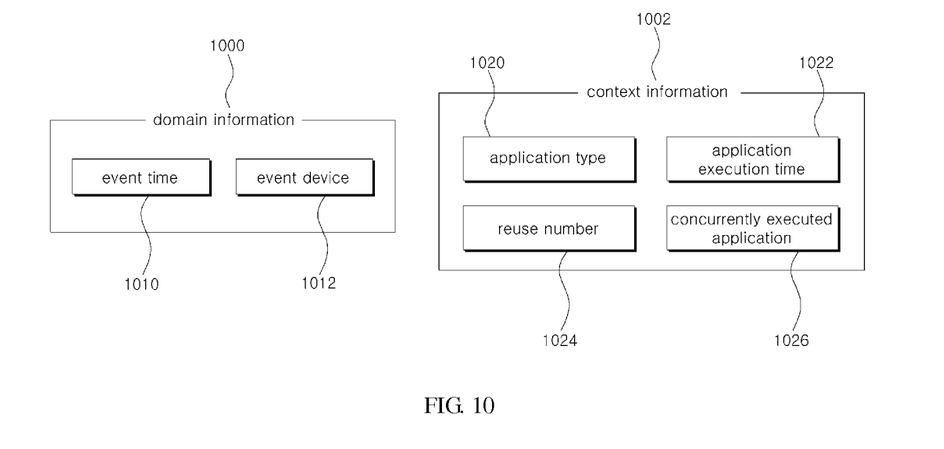
FIG. 10 illustrates the structure of information used for predicting reuse according to an embodiment of the invention.

FIG. 10 illustrates the structure of information used for predicting reuse according to an embodiment of the invention.

Referring to FIG. 10, from among the information used for predicting reuse, the domain information 1000 may include information regarding the time 1010 at which the event was triggered and the device 1012 at which the event was triggered, while the context information 1002 may include information regarding the application type 1020 executed by the user, the application execution time 1022, the number 1024 of reuses, and concurrently executed applications 1026.

In regard to the context information 1002, the application type 1020 information refers to information on the applications executed by the user. From among the context information 1002, the level of association between the application executed by the user and the shared data file may be utilized by the active process manager 606 as information for predicting an intention for reuse.

The application execution time 1022 is the time at which the user executed the application, and a value comparing the time at which an event was triggered in the domain information with the time at which the application was executed may be utilized as information for predicting an intention for reuse.

The information on the reuse number 1024 refers to information regarding the level of reuse by the user for the same event.

The information on concurrently executed applications 1026 refers to information on the applications that were executed together when the user reused the data file associated with the event. For example, if the user frequently executed a music player application while reusing a word file, then a higher level of reuse can be predicted when the music player application is concurrently executed. As such, the information on concurrently executed applications 1026 may also be utilized as information for predicting reuse.

The active process manager 606 may predict whether or not a shared data file will be reused by utilizing the domain information and context information such as those illustrated in FIG. 10, and if a reuse is predicted, the shared data file may be executed automatically when the application is executed, or a query message may be provided to the user as regards whether or not the data file is to be executed.

Figure 7:
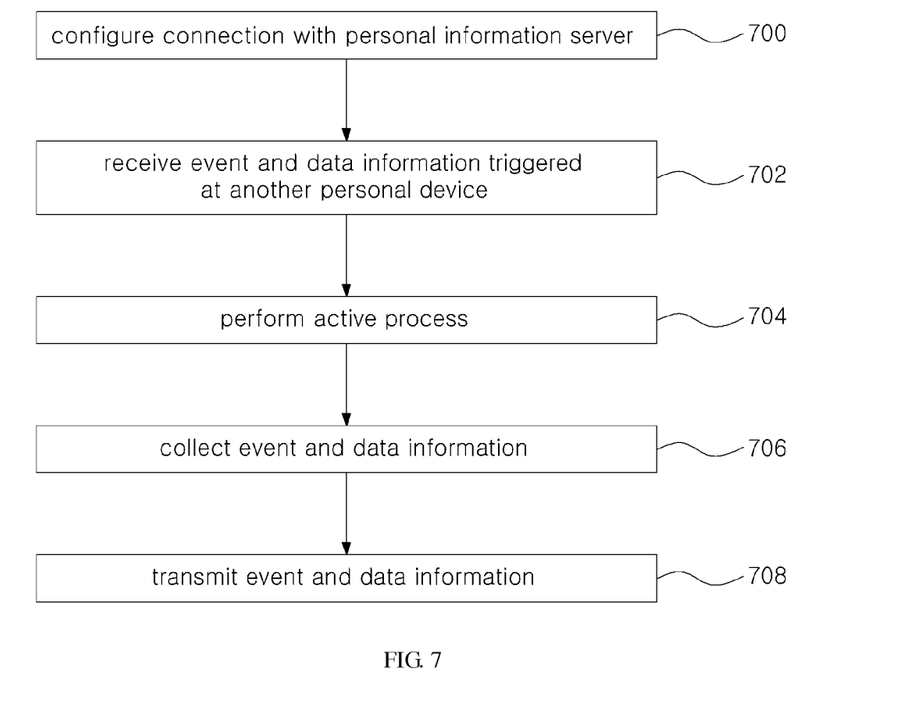
FIG. 7 is a flow diagram illustrating the operations of a personal device according to an embodiment of the invention.

FIG. 7 is a flow diagram illustrating the operations of a personal device according to an embodiment of the invention.

Referring to FIG. 7, when the personal device is activated, the personal device data manager 600 of the personal device may configure the connection with the personal information server to notify the device's activation (step 700).

When the configuring of the connection between the personal device and the personal information server is complete, the recent event and data information triggered at other personal devices may be received from the personal information server (step 702). In order to avoid redundant transmissions, the personal device data manager of the personal device can transmit shared event and data information already stored in the current personal device, and the personal information server may receive the information and transmit only the recent event and data information that is not already shared to the personal device.

When the event and data information is received from the personal information server, an active process may be performed based on the received event and data information (704). In cases where a word data file is received, as in the example described above, an active process can be performed which loads the word data file automatically through a word-processing application.

The data sharing application of the personal device may continuously monitor the events triggered at the personal device to collect information regarding the triggered events and the data related to the events (step 706).

The collected event and data information may be transmitted to the personal information server (step 708). The actions of monitoring events and transmitting the collected information on the events and data may be performed continuously until the user stops using the personal device.

Figure 8:
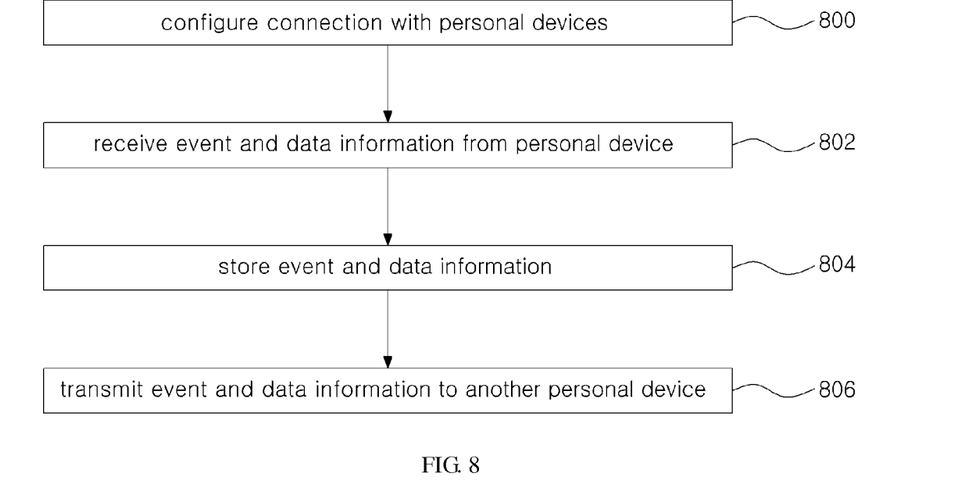
FIG. 8 is a flow diagram illustrating the operations of a personal information server according to an embodiment of the invention.

FIG. 8 is a flow diagram illustrating the operations of a personal information server according to an embodiment of the invention.

Referring to FIG. 8, the personal information server may configure the connections with the multiple number of personal devices registered by the user (step 800). The action of configuring the connections can be performed in accordance to connection configuration request information triggered by the data sharing application installed on the user's personal device. The personal information server may store the personal device information for which connections have been configured.

The personal information server may receive the event and data information triggered at the personal device being used by the user, from among the personal devices for which connections have been configured (step 802).

The personal information server may store the event and data information transmitted from the personal device being used (step 804).

The personal information server may transmit the stored event and data information to the other personal devices (step 806). As described above, an embodiment of the invention can have the personal information server transmit the event and data information when the user stops using the personal device currently in use and when the use of another personal device is sensed. Another embodiment of the invention can also have the event and data information transmitted to the personal devices for which connections have been configured, regardless of whether or not the other personal devices are being used.

Figure 9:
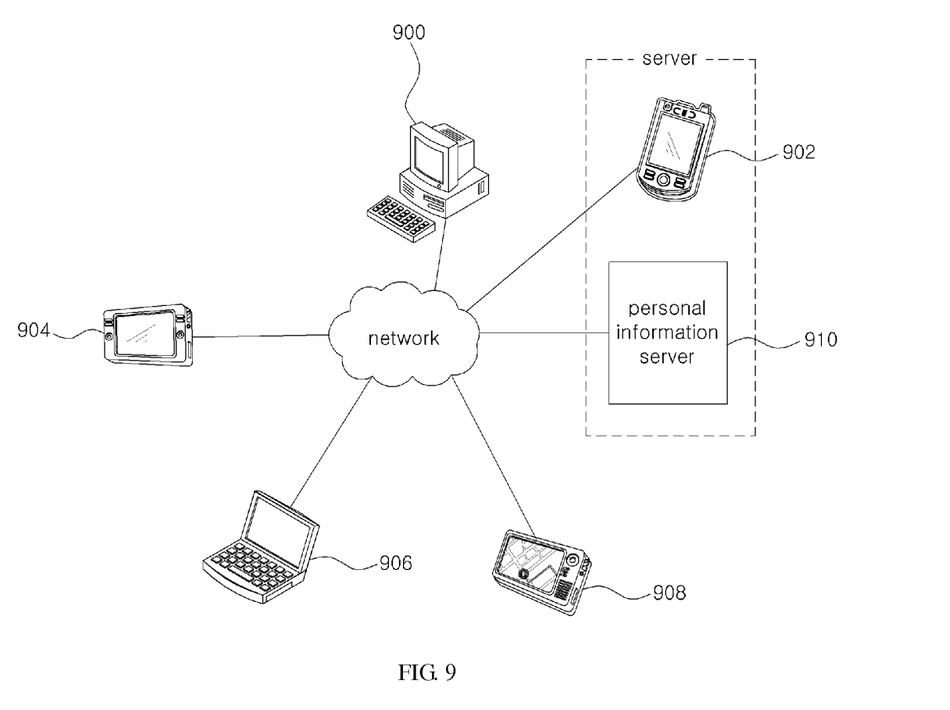
FIG. 9 illustrates the composition of a data sharing system according to still another embodiment of the invention.

FIG. 9 illustrates the composition of a data sharing system according to still another embodiment of the invention.

The embodiment illustrated in FIG. 9 relates to a system in which one personal device 902 from among the personal devices operates together with the personal information server 910 as a second server.

For instance, the second personal device 902, i.e. the smart phone, can be installed with a server application to operate as a second server. Although it is not illustrated in FIG. 9, another example can have the server application installed on a USB device equipped with a communication function that can be carried by the user, so that the USB device may operate as the second server.

According to the embodiment illustrated in FIG. 9, the data sharing application installed on each personal device may transmit the event information triggered at the personal device and the data related to the events, regardless of an explicit request by the user, to the personal information server 910 and the personal device 902 installed with the server application.

Alternatively, the data sharing application installed on each personal device can transmit the event information triggered at the personal device to the personal information server 910 and transmit the data associated with the events to the personal device 902 operating as a server. Of course, it is also possible to transmit the event information to the personal device 902 operating as a server and transmit the data to the personal information server 910.

In an embodiment in which the event information and the data related to the events are all stored in the personal information server 900 and the personal device 902 operating as a server, the event information triggered at a particular personal device and its associated data may together be transmitted to and stored on the personal information server 910 and the personal device 902 operating as the second server, but the action of transmitting the stored event information and data to the other personal devices may be implemented primarily by the personal device 902 operating as a server.

If the personal device 902 operating as a server fails the action of transmitting the stored event information and data file to the personal devices for data sharing, then the personal information server 900 may transmit the stored event information data file to the personal devices for sharing data.

For instance, if a failure occurs in the transmission of the event information and data files because of a poor communication channel between the personal device 902 operating as the server and the personal devices for data sharing, then the personal information server 910 may secondarily transmit the event information and data files to the personal devices for data sharing.

According to an embodiment of the invention, the transmission failure information of the personal device 902 operating as a server can be transmitted from the personal device 902 operating as the server to the personal information server 910, so that the personal information server 910 may perform the secondary transmission of event information and data files.

With the embodiment of FIG. 9 described above, there are essentially two servers operating, so that when a problem occurs in communication for any one server, the other server may perform the transmission of event information and data files, to thereby enhance the reliability of the data sharing.

Also, since one of the multiple number of personal devices operates as a second server together with the personal information server, the load on the server can be reduced.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodi-

What is claimed is:

1. A personal information server configured to communicate over a network with a plurality of registered personal devices, the personal information server comprising:
   a processor coupled to a memory;
   a server data manager configured to receive an event triggered at a personal device being used from among the plurality of personal devices and data information related to the event; and
   a server database manager configured to store the event and data information received at the server data manager,
   wherein the server data manager transmits the event and data information stored at the server database manager to a personal device which does not have the event and data information stored thereon from among the registered personal devices, and
   a data sharing application installed in each of the plurality of registered personal devices transmits the event and data information triggered at the personal device;
   wherein the data sharing application installed in the personal device transmits the event and data information regardless of a request by a user and controls the personal device to transmit activation information to the server data manager when the personal device is turned on or activated by a use by the user;
   wherein the data sharing application installed in the personal device, upon receiving the event and data information from the personal information server, controls the personal device to perform an active process corresponding to a type of the received event and data information.

2. The personal information server of claim 1, wherein the server data manager transmits the event and data information to another personal device regardless of a request from the personal devices.

3. The personal information server of claim 2, wherein the server data manager, upon detecting a use of a particular personal device from among the plurality of personal devices, transmits the event and data information stored at the server database manager to the particular personal device.

4. The personal information server of claim 2, wherein the server data manager, upon receiving the event and data information from the personal device being used, transmits the event and data information over the network to other personal devices available for communication.

5. The personal information server of claim 1, wherein one of the personal devices operates as the personal information server.

6. The personal information server of claim 1, wherein at least one of the personal devices has a server application installed thereon so as to operate as a server together with the personal information server.

7. The personal information server of claim 1, wherein one of the personal information server and the personal device operating as a server operates as a main server and the other operates as a sub-server.

8. A personal device of a user configured to communicate over a network with a personal information server, the personal device comprising:
   a processor coupled to a memory;
   a personal device data manager configured to receive from the personal information server an event triggered at another personal device of the user and data information related to the event;
   a personal device monitoring manager configured to monitor and collect an event triggered by a use of the personal device of the user and data information, wherein the personal device data manager transmits the event and data information collected at the personal device monitoring manager to the personal information server;
   wherein the personal device data manager transmits activation information to the personal information server when the personal device of the user is turned on or activated by use; and
   an active process manager configured to perform an active process upon receiving an event and data information triggered at another personal device of the user, the active process corresponding to a type of the received event and data information.

9. The personal device of claim 8, wherein the personal device data manager transmits the collected event and data information to the personal information server regardless of a request by the user.

10. The personal device of claim 8, wherein the personal device data manager accesses the personal information server and receives the event and data information of the another personal device regardless of a request by the user.

11. The personal device of claim 8, wherein the active process manager automatically executes data based on a learning result regarding whether or not the data is reused.

12. A non-transitory recorded medium having recorded thereon and tangibly embodying a program of instructions executable by a personal device of a user in an event and data sharing system comprising a plurality of personal devices and a personal information server configured for communication over a network, the program of instructions configured to perform a method comprising:
   (a) receiving from the personal information server an event triggered at another personal device of the user and data information related to the event;
   (b) monitoring the personal device of the user and collecting an event triggered by use and data information;
   (c) transmitting the collected event and data information to the personal information server;
   (d) transmitting activation information to the personal information server if the personal device of the user is turned on or activated by use, wherein said step (d) comprises transmitting the collected event and data information to the personal information server regardless of a request by the user; and
   (e) performing an active process if an event triggered at another personal device of the user is received, the active process corresponding to a type of the received event and data information.

13. The recorded medium of claim 12, wherein said step (a) comprises accessing the personal information server and receiving the event and data information of the another personal device regardless of a request by the user.

14. The recorded medium of claim 12, wherein the active process automatically executes data based on a learning result regarding whether or not the data is reused.

* * * * *